United States Patent
Tokuyoshi et al.

(10) Patent No.: US 9,275,477 B2
(45) Date of Patent: Mar. 1, 2016

(54) REAL-TIME GLOBAL ILLUMINATION RENDERING SYSTEM

(71) Applicant: KABUSHIKI KAISHA SQUARE ENIX, Tokyo (JP)

(72) Inventors: Yusuke Tokuyoshi, Tokyo (JP); Shinji Ogaki, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 426 days.

(21) Appl. No.: 13/693,396

(22) Filed: Dec. 4, 2012

(65) Prior Publication Data

US 2013/0155089 A1   Jun. 20, 2013

Related U.S. Application Data

(60) Provisional application No. 61/567,113, filed on Dec. 5, 2011.

(51) Int. Cl.
G06T 15/50   (2011.01)
G06T 11/00   (2006.01)

(52) U.S. Cl.
CPC .............. *G06T 11/001* (2013.01); *G06T 15/506* (2013.01)

(58) Field of Classification Search
CPC ........................................................ G06T 15/80
USPC ................................................. 345/582, 586
See application file for complete search history.

(56) References Cited

U.S. PATENT DOCUMENTS 6,329,989 B1 * 12/2001 Qi et al. .......................... 345/428
8,300,234 B2 * 10/2012 Debevec et al. ............... 356/600
2007/0018996 A1 * 1/2007 Wang et al. .................... 345/592
2010/0309203 A1   12/2010 Masuda et al.
2010/0328677 A1 * 12/2010 Debevec et al. ............... 356/600
2011/0273448 A1   11/2011 Geraci et al.
2012/0299938 A1   11/2012 Iwasaki

OTHER PUBLICATIONS

Whitted, Turner; "An Improved Illumination Model for Shaded Display"; Jun. 1980; ACM; vol. 23; pp. 343-349.*
Whitted, Turner; "An Improved Illumination Model for Shaded Display"; Jun. 1980; Communications of the ACM; vol. 23; No. 6; pp. 343-349.*
Hachisuka, Toshiya, "High-Quality Global Illumination Rendering Using Rasterization". GPU Gems 2, Addison-Wesley Professional, Ch. 38, pp. 615-634 (2005), available at http://http.developer.nvidia.com/GPUGems2/gpugems2_chapter38.html.
Keller, Alexander, "Instant Radiosity", In ACM SIGGRAPH, Computer Graphics Proceedings, Annual Conference, 1997, pp. 49-56.

* cited by examiner

*Primary Examiner* — Mark Zimmerman
*Assistant Examiner* — Jonathan M Cofino
(74) *Attorney, Agent, or Firm* — Greenblum & Bernstein, P.L.C.

(57) ABSTRACT

A shading method and computer graphics system are provided in which a path of light is reflected at a given object from a virtual light source. The path of light reaches a given eye point is sampled. A distribution function for a surface of the object is obtained using the sampled path of light, and arithmetic processing is performed such that a maximum value of the distribution function is less than or equal to a predetermined value. In this regard, an estimated specular roughness of the surface of the object is obtained by setting the distribution function to be less than or equal to the predetermined value.

5 Claims, 3 Drawing Sheets

REAL-TIME GLOBAL ILLUMINATION RENDERING SYSTEM

BACKGROUND

1. Technical Field

The present invention relates to a real-time global illumination rendering system in which artifacts are suppressed by estimating appropriate specular roughness using sampling results and performing shading using the estimated specular roughness.

2. Related Art

In computer graphics, in order to determine brightness of an object close to the actual one, rendering by global illumination (GI) is performed. The global illumination is an illumination calculation taking into account not only a direct light component from a light source, but also an indirect light component. To represent in which direction and at what intensity the indirect light is reflected, a bidirectional reflectance distribution function (BRDF) is used.

In global illumination, as a method for determining an indirect light component, there is known final gathering (HACHISUKA, T. 2005. High-quality global illumination rendering using rasterization. In GPU Gems 2. Addison-Wesley Professional, ch. 38, 615-634). Final gathering is a method for determining an indirect light component by tracing a plurality of rays.

In addition, as a technique for determining an indirect light component, there is known an instant radiosity method using a virtual point light source (KELLER, A. 1997. Instant radiosity. In ACM SIGGRAPH '97, 49-56). As a technique for tracing rays in the same direction at a time, there are ray-bundles.

To represent in which direction and at what intensity light is reflected, a bidirectional reflectance distribution function (BRDF) is proposed. Examples of already-known BRDF models include a Lambert model representing diffuse reflection, a Phong model representing specular reflection, a Blinn model, and a Cook-Torrance model.

SUMMARY OF THE INVENTION

To attempt to implement rendering by global illumination (GI) based on the conventional methods, there is a problem of the occurrence of artifacts. In addition, ray-bundles have a problem of poor sampling efficiency for specular reflection. In the case of off-line rendering, by increasing the number of samples, computer graphics close to the actual one can be obtained even by ray-bundles. However, since the number of calculations increases, ray-bundles are not suitable for real-time rendering.

When, for a specular reflection model, shading is performed using ray-bundles or instant radiosity, there is a problem of the occurrence of sharp artifacts.

An object of the present invention is therefore to provide an artifact-free, real-time global illumination rendering system.

The present invention is basically based on the finding that artifact-free, real-time global illumination rendering can be performed by estimating appropriate specular roughness using sampling results and performing shading using the estimated specular roughness ($\alpha_i$).

A first aspect of the present invention is directed to a shading method by a computer, in which appropriate specular roughness that does not cause artifacts is estimated using sampling results and shading is performed using the estimated specular roughness. This method includes a sampling step (S101) and an estimated specular roughness obtaining step (S102). After obtaining estimated specular roughness, shading is performed based on a normal method.

The sampling step (S101) is a step of sampling, for a plurality of samples, a path of light reflected at a given object from a virtual light source and reaching a given eye point.

The estimated specular roughness obtaining step (S102) is a step for obtaining estimated specular roughness of a surface of the object by obtaining a distribution function for the surface of the object using the paths obtained in the sampling step and performing arithmetic processing such that a maximum value of the distribution function is less than or equal to a predetermined value. By using the estimated specular roughness obtained in this step, artifact-free, real-time global illumination rendering can be performed.

A second aspect of the present invention is directed to a computer graphics system that estimates, using sampling results, appropriate specular roughness that does not cause artifacts, and performs shading. That is, the system is a computer graphics system that implements the sampling method of the first aspect. The system includes a sampling unit 101 and an estimated specular roughness obtaining unit 102.

The sampling unit 101 is a component for sampling, for a plurality of samples, a path of light reflected at a given object from a virtual light source and reaching a given eye point.

The estimated specular roughness obtaining unit 102 is a component for obtaining estimated specular roughness of a surface of the object by performing arithmetic processing using the paths obtained by the sampling unit such that a maximum value of a distribution function is less than or equal to a predetermined value.

A shading method of the present invention is based on the above-described method and thus can determine estimated specular roughness ($\alpha_i$) of a surface of an object with suppressed artifacts based on a small number of sampling data and can perform shading. Thus, with the use of the shading method of the present invention, real-time global illumination rendering can be implemented in particular for scenes including specular reflection.

DETAILED DESCRIPTION

Figure 1:
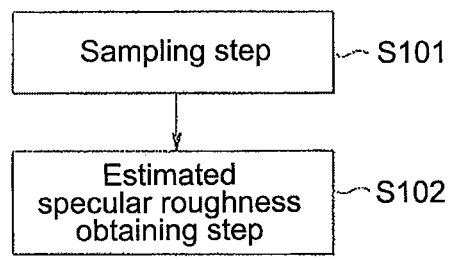
FIG. 1 is a flowchart for describing an example of a shading method related to a first embodiment of the present invention.

FIG. 1 is a flowchart for describing an example of a shading method related to a first embodiment of the present invention. As shown in FIG. 1, the method includes a sampling step (S101) and an estimated specular roughness obtaining step (S102). Shading using a specular roughness parameter ($\alpha$) is already known. Therefore, in the present invention, after obtaining estimated specular roughness ($\alpha_i$), shading is performed based on a normal method, using the estimated specular roughness ($\alpha_i$) as a specular roughness parameter.

Figure 2:
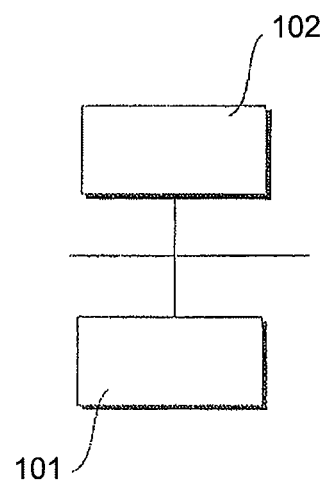
FIG. 2 is a block diagram of a computer graphics system according to the first embodiment.

FIG. 2 is a block diagram of a computer graphics system according to the first embodiment. The computer graphics system shown in FIG. 2 is a system that estimates, using sampling results, appropriate specular roughness that does not cause artifacts, and performs shading. The system shown in FIG. 2 includes a sampling unit 101 and an estimated specular roughness obtaining unit 102. Though not particularly shown, the system preferably includes a display unit and a shading unit that performs shading using obtained estimated specular roughness ($\alpha_i$). By this, the system can obtain computer graphics using the obtained estimated specular roughness ($\alpha_i$), and display the computer graphics on the display unit.

Figure 3:
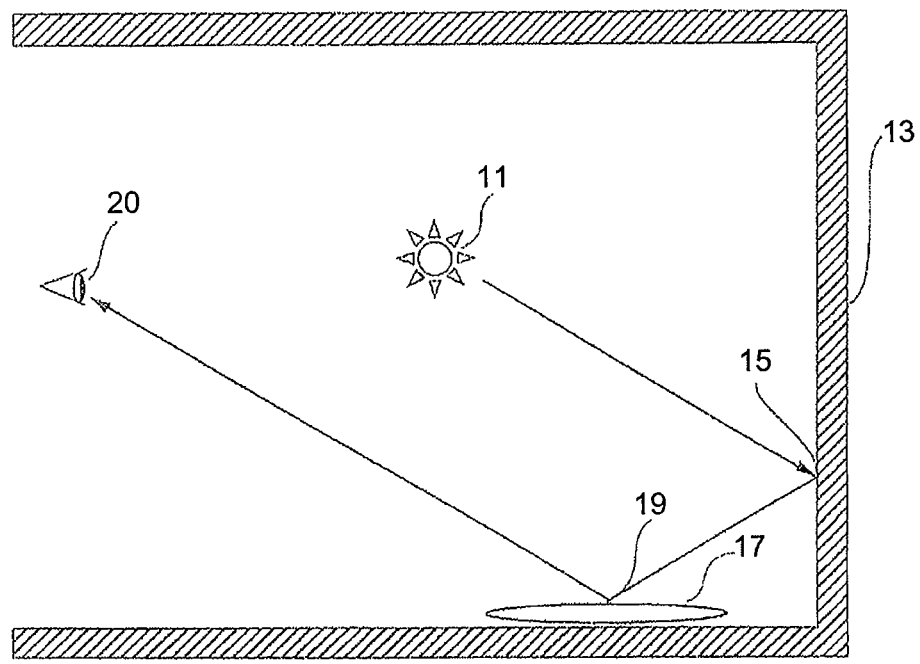
FIG. 3 is a diagram for describing a light path of indirect illumination.

FIG. 3 is a diagram for describing a light path of indirect illumination. Light from a light source 11, for example, is reflected at a given point 15 on a wall 13 and is then reflected at a given point 19 on a surface of an object 17. The point 15 serves as a virtual light source. Then, the light reflected at the given point 19 reaches an eye point 20. This light path can be determined by, for example, a computer reading the coordinates of the eye point 20, the surface of the object 17, the wall 13, and the light source 11 from a storage unit and performing a computation for determining a light path. This system is configured, for example, to be able to design coefficients for reflection in association with coordinate values. Hence, the computer stores, for example, in the storage unit, coefficients for reflection associated with the given point 19 on the object 17 and the given point 15 on the wall 13. The coefficients, for example, may be stored in a database or may be temporarily stored in a buffer. Then, the computer reads the coefficients for reflection for the given point 19 on the object 17 and the given point 15 on the wall 13. The computer may be configured to be able to determine reflection paths using the read coefficients. In this manner, the computer can sample a path of light reflected at the given object 17 from the virtual light source 15 and reaching the given eye point 20.

Note that upon actual calculation, a light path may be determined where a plurality of rays are emitted from the eye point 20 and light reflected at the given point 19 is reflected at the given point 15 on the wall 13 and then reaches the light source 11. In addition, a virtual screen may be determined between the eye point 20 and the object 17. Then, samples on the screen may be connected to the eye point 20, and a plurality of lines of sight may be determined thereby. Furthermore, of the plurality of lines of sight, a line of sight reaching the object 17 may be determined. A method for determining the light path is already known in, for example, a ray tracing method. In addition, in actual calculation, light paths may be determined where a plurality of rays are emitted from the eye point 20 and light reflected at a plurality of locations is reflected at other points and then reaches the light source 11.

The sampling unit 101 is a component for sampling, for a plurality of samples (sample points), a path of light reflected at the given object 17 from the light source 11 and reaching the given eye point 20. The component is implemented by a program, a control apparatus, an arithmetic apparatus, a storage apparatus, etc. A sample may be, for example, a point on a virtual screen in a path of line of sight.

The estimated specular roughness obtaining unit 102 is a component for obtaining estimated specular roughness ($\alpha_i$) of a surface of the object 17, using the paths obtained by the sampling unit 101. The estimated specular roughness obtaining unit 102 determines an intersection point (collision point) of a line of sight and the object using a path obtained by the sampling unit 101, and determines a distribution function for the intersection point. The distribution function is stored in the storage unit so as to be associated with coordinates. Therefore, the distribution function can be read from the storage unit using the coordinates of the intersection point. The distribution function is represented by a predetermined function and is represented using an object surface roughness parameter $\alpha$. The distribution function can be said to be a function indicating the roughness of the surface of the object. The object surface roughness parameter $\alpha$ is known and is, for example, stored in the storage unit so as to be associated with coordinate values or the object. Then, the estimated specular roughness obtaining unit 102 determines density of the paths and represents the distribution function using the density of the paths and performs arithmetic processing such that the maximum value of the distribution function is less than or equal to a predetermined value. The density of paths may be obtained analytically. In addition, the density of paths may be, for example, the density of paths present within a predetermined range from a given sample point, or may be the density of paths present within a predetermined range from a given point on a virtual screen. In addition, the density of paths can also be determined by determining the number of paths passing through a screen with a certain area and using the area of the screen and the number of paths. To represent the distribution function using the density of paths, a relational expression between the distribution function and the density of paths is stored, and a computation for representing the distribution function is allowed to be performed based on the relational expression after determining the density of paths. This computation can be implemented by a program or can also be implemented by hardware. In this manner, the estimated specular roughness obtaining unit 102 can obtain the estimated specular roughness ($\alpha_i$) of the surface of the object. The predetermined value is read from the storage unit before performing arithmetic processing. The density of paths is thus determined, and estimated specular roughness ($\alpha_i$) at which the maximum value of the distribution function is less than or equal to the predetermined value is determined, and then shading is performed using the estimated specular roughness ($\alpha_i$). Hence, the system of the present invention can suppress artifacts. The estimated specular roughness obtaining unit 102 is actually implemented by a program, a control apparatus, an arithmetic apparatus, a storage apparatus, etc.

Figure 4:
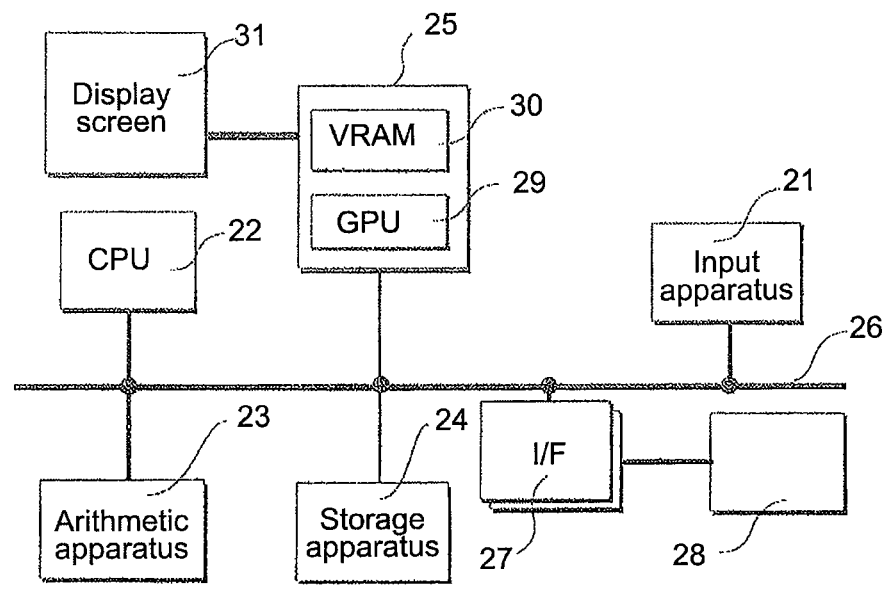
FIG. 4 is a block diagram showing an exemplary hardware configuration of a system of the present invention.

FIG. 4 is a block diagram showing an exemplary hardware configuration of a system of the present invention. The system includes an input apparatus 21, a control apparatus 22, an arithmetic apparatus 23, a storage apparatus 24, and an image processing block 25. The components are connected to each other by a bus 26 so that they can give and receive information to/from each other. In addition, the system is connected to an interface (I/F) 27 via the bus 26. Hence, for example, the system can be connected to an information recording medium 28 that stores a program, through the I/F 27. The program is to cause a computer to function as an apparatus having predetermined means and predetermined functions. In addition, the program is to cause the computer to perform predetermined steps. Note that a memory connected through the I/F 27 may function as all or part of the storage apparatus 24.

The image processing block 25 includes a graphics processing unit (GPU) 29 and a video RAM (VRAM) 30. The GPU 29 and the VRAM 30 are connected to each other so that they can give and receive information to/from each other. Reference numeral 31 in the drawing indicates a display screen (monitor). The GPU 29 and the VRAM 30 may implement a shading method of the present invention.

In addition, for example, the working space of the control apparatus 22, the arithmetic apparatus 23, and the storage apparatus 24 and the program stored in the information recording medium 28 may function as the sampling unit 101 and the estimated specular roughness obtaining unit 102. In this case, the storage areas of the storage apparatus 24 and the information recording medium 28 function as areas that store information necessary for computations and working areas. When operation information is inputted from the input apparatus 21, the operation information is passed to the control apparatus 22 via the bus 26. The control apparatus 22 then reads the program stored in the information recording medium 28 and performs a predetermined process. The control apparatus 22 reads various information stored in the storage apparatus 24 and the information recording medium 28 in response to an instruction from the program, and the arithmetic apparatus 23 performs a predetermined computation. The control apparatus 22 appropriately stores the results of the computation in the storage apparatus 24, performs a predetermined process using the results of the computation, and appropriately stores the resulting information in the storage apparatus 24 such as a frame buffer, and then, outputs appropriate information from the monitor 31.

The above-described system may function as a geometry unit, a rendering unit, a frame buffer, and a display unit in order to implement a shading method of the present invention to obtain computer graphics. The geometry unit receives polygon data and performs calculations including a brightness calculation. The rendering unit performs a rendering process using vertex information and information including brightness data. Raster data obtained through the rendering unit is temporarily stored in the frame buffer and is displayed on the display unit.

Next, a first sampling method of the present invention will be described.

A sampling step (S101) is a step of sampling, for a plurality of samples, a path of light reflected at the given object 17 from the virtual light source 15 and reaching the given eye point 20. For the sampling step, for example, a normal sampling step in a ray tracing method can be adopted.

An example of the sampling step will be described below. Note that the following example is merely exemplification and thus it is apparent that any other method than the following method may be used as long as a path that reaches the eye point 20 from the light source 11 through the virtual light source 15 and the object 17 can be determined.

Step 1: Lines of sight going in a direction of the object 17 from the given eye point 20 through a given pixel on a screen are determined. Thereafter, the object 17 intersecting the determined lines of sight is checked. In this step, for example, the coordinates of the eye point 20 are read from the storage unit. Then, from the coordinates of the eye point 20, lines of sight are radiated in a plurality of directions. At this time, lines of sight passing through a given pixel on the screen may be determined. An object(s) intersecting the respective lines of sight is(are) checked. At this time, the coordinates of one or a plurality of objects (or the vertex coordinates of polygons composing an object(s)) are read from the storage unit. Then, using the read coordinates, a computation for determining whether the lines of sight intersect the object(s) is performed. In this manner, it can be determined whether lines of sight passing through a given pixel on the screen intersect a given object. After determining whether the given object intersects the lines of sight, information on the intersecting object is stored in the storage unit for each line of sight.

Step 2: When there is an object intersecting a given line of sight, a computation for determining an intersection point of the line of sight and the object is performed. When there are a plurality of objects intersecting a given line of sight, for example, intersection points of the given line of sight and all of the objects may be determined. At this time, the vertex coordinates of polygons composing an object may be read from the storage unit, and a computation for determining an intersection point of a given polygon and a given line of sight may be performed.

Step 3: Distances to intersection points of a given line of sight and objects intersecting the given line of sight may be determined, and an object closest to the eye point may be extracted. Then, information indicating that, of the objects intersecting the given line of sight, a given object is present closest to the eye point side may also be stored together. The fact that a given object is present closest to the eye point side for a given line of sight can be determined by, for example, performing a computation for comparing distances between the eye point and the coordinates of the intersection points of the line of sight and objects.

In this manner, a group of lines of sight intersecting a given object can be determined. Then, information about those of the plurality of lines of sight that are determined to intersect the given object may be stored in the storage unit. Furthermore, information about a given object that intersects one of the plurality of lines of sight and that is, moreover, determined to be present at the forefront may be stored in the storage unit. By reading these pieces of information stored in the storage unit, the lines of sight intersecting the given object can be read.

It is determined whether an object or a wall present in the above-described path is an object causing reflection or refraction. Since the storage unit stores information about objects (or polygons included in objects) and information about whether the objects are objects causing reflection or objects causing refraction, such a determination is made by reading the information from the storage unit. When the object or wall present in the above-described path is an object causing reflection or refraction, data for determining a reflection direction or a refraction direction is read from the storage unit, and a computation is performed using the read data together with information about the above-described direction of the line of sight, by which a reflection direction or a refraction direction is determined. Then, using the determined reflection direction or refraction direction as a new line of sight, the above-described steps 2 and 3 are performed and a computation for extracting an object that appears reflected or refracted is performed.

By doing the above, a plurality of paths on a given screen can be determined. In addition, a path for one of a plurality of samples on a given screen that is related to a line of sight intersecting a given object can also be determined.

The estimated specular roughness obtaining step (S102) is a step for obtaining estimated specular roughness ($\alpha_t$) of the surface of the object by obtaining a distribution function for the surface of the object using the plurality of paths obtained in the sampling step, and performing arithmetic processing such that the maximum value of the distribution function is less than or equal to a predetermined value.

For example, in this step, the computer reads, from the storage unit, paths for a group of lines of sight intersecting a given object among lines of sight from a given eye point, which are determined in the sampling step. Then, a distribution function for each intersection point associated with intersection point coordinates is read from the storage unit. The distribution function is a known function indicating the reflectance distribution of incident light.

When an intersection point (collision point) distribution function is determined, estimated specular roughness ($\alpha_t$) of the surface of the object is obtained. Specifically, from the plurality of paths determined in the sampling step, the density of the paths is determined and a distribution function is represented. Then, arithmetic processing is performed such that the maximum value of the distribution function is less than or equal to a predetermined value represented including the density of the paths. To implement this step, for example, a predetermined value is stored in the storage unit in advance. When this computation is performed, the predetermined value is read from the storage unit. Then, a computation for determining the maximum value of the distribution function is performed. Thereafter, a computation is performed such that the maximum value of the distribution function is less than or equal to (or is less than) the predetermined value. By doing so, estimated specular roughness ($\alpha_i$) at which the maximum value of the distribution function is less than or equal to the predetermined value can be determined. The system of the present invention performs shading using the estimated specular roughness ($\alpha_i$). Hence, a situation in which artifacts occur can be suppressed.

Figure 5:
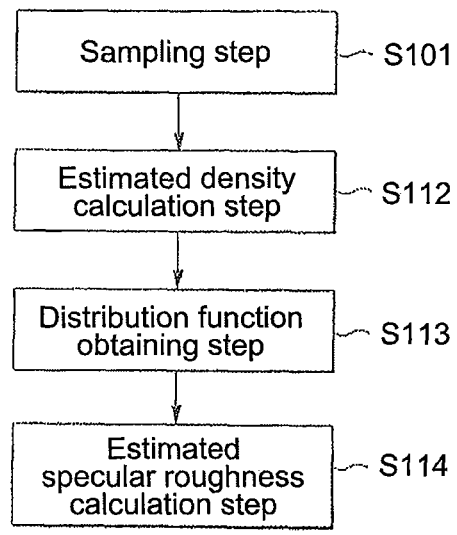
FIG. 5 is a flowchart showing an example of steps for describing a shading method related to a second embodiment of the present invention.

Next, a second embodiment of the present invention will be described. The second embodiment is an embodiment for definitely achieving determination of appropriate estimated specular reflection roughness that does not cause artifacts, by a shading method of the present invention. FIG. 5 shows an example of steps for describing a shading method related to the second embodiment of the present invention. As shown in FIG. 5, the shading method includes a sampling step (S101), an estimated density calculation step (S112), a distribution function obtaining step (S113), and an estimated specular roughness calculation step (S114).

Figure 6:
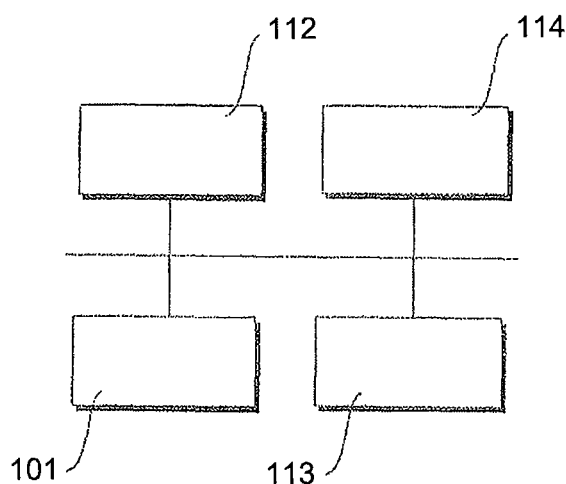
FIG. 6 is a block diagram for describing a computer graphics rendering system using a computer which is related to the second embodiment of the present invention.

FIG. 6 is a block diagram for describing a computer graphics rendering system using a computer which is related to the second embodiment of the present invention. As shown in FIG. 6, the system includes a sampling unit 101, an estimated density calculating unit 112, a distribution function obtaining unit 113, and an estimated specular roughness calculating unit 114. The sampling unit 101, the estimated density calculating unit 112, the distribution function obtaining unit 113, and the estimated specular roughness calculating unit 114 are virtual components of a computer for implementing a sampling step (S101), an estimated density calculation step (S112), a distribution function obtaining step (S113), and an estimated specular roughness calculation step (S114), respectively. The computer's input/output unit, storage unit, arithmetic unit, control unit, and bus connecting the units implement the above-described components.

The sampling unit 101 is a means for sampling light paths for a plurality of samples reflected at an object from a virtual light source and reaching a given eye point.

The estimated density calculating unit 112 is a means for determining, using the paths obtained by the sampling unit 101, estimated density (probability density) which is the density of the paths.

The distribution function obtaining unit 113 is a means for obtaining a distribution function for an intersection point of the object and one of the paths determined by the sampling unit 101.

The estimated specular roughness calculating unit 114 is a means for determining estimated specular roughness of the surface of the object by performing arithmetic processing on the distribution function obtained by the distribution function obtaining unit 113, using the density of the paths determined by the estimated density calculating unit 112 such that the maximum value is less than or equal to a predetermined value.

The sampling step (S101) is a step for sampling, by the computer, light paths for samples reflected at a given object from a virtual light source and reaching a given eye point. The virtual light source is a virtual light source in three-dimensional computer graphics. This step is the same as the sampling step of the first embodiment.

The estimated density calculation step (S112) is a step for determining, using the paths obtained in the sampling step, estimated density (probability density) which is the density of the paths. The estimated density at position y can be represented as d hat(y). In the sampling step, normally, a plurality of paths are determined. In this example, the density of the paths is determined analytically. Specifically, when a plurality of paths are determined in advance, the density of the paths may be able to be determined according to the number of the determined paths, or the density of the paths may be able to be determined from the positions of the determined plurality of paths. In the former case, after determining the number of paths, predetermined arithmetic processing is performed using the determined number of paths, by which the density of the paths can be determined. In the latter case, when a plurality of paths together with their positions are determined in the sampling step, predetermined arithmetic processing is performed, by which the density of the paths can be determined.

The distribution function obtaining step (S113) is a step for obtaining a distribution function for an intersection point of the object and one of the paths determined in the sampling step (S101). In the sampling step (S101), an intersection point of a line of sight (i.e., a path) and the object is determined. Then, in this step (S113); for example, the computer reads the coordinates of the intersection point from the storage unit. Then, the computer reads, using the coordinates of the intersection point, a distribution function stored so as to be associated with the read coordinates of the intersection point from the storage unit. In this manner, the distribution function for the intersection point of the path and the object can be obtained. Note that the distribution function is a predetermined function using the roughness parameter $\alpha$ of the object.

The estimated specular roughness calculation step (S114) is a step for determining estimated specular roughness of the surface of the object including a sample, by performing arithmetic processing such that the maximum value of the distribution function obtained in the distribution function obtaining step (S113) is less than or equal to a predetermined value. The estimated specular roughness ($\alpha_i$) is a value that estimates specular roughness at which artifacts are less likely to occur and that is used when determining specular reflection at a surface of a given object in computer graphics. In the present invention, by using, as surface roughness, the estimated specular roughness instead of already known surface roughness ($\alpha$), computer graphics with suppressed artifacts can be achieved. The distribution function can be represented using, for example, the density of the paths d hat (y). Then, by performing arithmetic processing such that the maximum value of the distribution function is less than or equal to the predetermined value, estimated specular roughness ($\alpha_i$) can be determined. For example, the maximum value of the distribution function (i.e., the maximum value of a function including the density of the paths) is determined, and a coefficient of the function including the density of the paths is determined such that the maximum value is less than or equal to a predetermined value. Thereafter, surface roughness is represented using the coefficient and the density of the paths. Then, a computation is performed to determine the smaller one of the surface roughness using the coefficient and the density of the paths and the already known surface roughness ($\alpha$). Then, in this embodiment, the larger one of the parameter of the determined smaller one and 0 is determined to be estimated specular roughness. This computation can be performed by a circuit or a program that reads, by the computer, a distribution function and a density of the paths d hat (y) from the storage unit and performs a predetermined computation.

The computer can determine estimated specular roughness in the above-described manner. Then, the computer performs a shading process in which a scene including indirect light is rendered using the estimated specular roughness. The system of the present invention is particularly effective for rendering a surface of a specular object. After performing the shading process, rasterization is performed, by which computer graphics can be obtained.

Example 1

The method of the following example compresses artifacts by smoothing. The method calculates the roughness parameter of gloss article, which has brilliance, by clamping based on assumption of kernel density. Generally, density estimation is represented by:

$$\hat{d}(y) = \sum_{i}^{N} \frac{K(\|y_i - y\|, r)}{V(r)} \Phi(y_i) \quad \text{[Number 1]}$$

where $\hat{d}(y)$ (d hat(y)) is the estimated density at the position y, K the kernel function, $y_i$ the position of the ith particle, $\Phi$ the weight of the particle, r the kernel radius, and V(r) is a normalization factor.

The particles correspond to calculated paths.

If the radius is too small, the estimated density distribution can be spiky and extremely different from the actual one. We may use a different kernel radius for each particle.

$$\hat{d}(y) = \sum_{i}^{N} \frac{K(\|y_i - y\|, r_i)}{V(r_i)} \Phi(y_i) \quad \text{[Number 2]}$$

If the density $\hat{d}(y_i)$ is given, we can obtain the appropriate $r_i$ using the following equation:

$$r_i = V^{-1}\left(\frac{n}{\hat{d}(y_i)}\right) \quad \text{[Number 3]}$$

where n is the number of nearest neighbor particles. We treat the distribution function D as the kernel function as:

$$D(\theta) = \frac{K(\theta, r)}{V(r)} \quad \text{[Number 4]}$$

That is, we consider the roughness parameter of a material approximately corresponds to r. The maximum value of D is limited as follows:

$$\max_{\theta}(D(\theta)) \frac{n}{\hat{d}(y_i)} \leq 1 \quad \text{[Number 5]}$$

To satisfy the above Equation, we provide a new concept regarding the roughness of the material.

For example, we show the case of D being phong distribution as follows:

$$D(\theta) = \frac{\alpha + 1}{2\pi} \cos^{\alpha}(\theta) \quad \text{[Number 6]}$$

where $\alpha$ (alpha) is the phong exponent to control roughness of a surface. In this case, alpha meets following:

$$0 \leq \alpha \leq \frac{2\pi \hat{d}(y_i)}{n} - 1 \quad \text{[Number 7]}$$

Then, we can clamp roughness parameter $\alpha$ of the ith particle as the following estimated roughness parameter $\alpha_i$.

$$\alpha_i = \max\left(0, \min\left(\alpha, \frac{2\pi \hat{d}(y_i)}{n} - 1\right)\right) \quad \text{[Number 8]}$$

To clamp the roughness using the above distribution function D, we use the following assumption:

$$\frac{1}{\hat{d}(y_i)} = \frac{1}{d(x, \omega_i)} + \frac{1}{d(x, \omega_i')} \quad \text{[Number 9]}$$

where $d(x, w_i)$ is the density of samples per unit solid angle at the position x and direction $w_i$. The $w_i$ and $w'_i$ are the incoming and outgoing direction of the ith sample, respectively. We consider the situation when the path $(x_0, x_1, x_2, x_3)$ is sampled (see FIG. 4). For the sake of simplicity, we write $\hat{d}(y_j)$ at $x_j$ as $\hat{d}_j$, and $d(x_j, w_j, k)$ as $d_{j,k}$. The $w_{i,j}$ means the direction from the position $x_j$ to the position $x_k$.

In calculation of FG, final gathering, considering that $D_{3,4}$ is infinity, $\hat{d}$ is given by:

$$\hat{d}_3 = d_{3,2} = N p_g(\omega_{3,2}) \quad \text{[Number 10]}$$

N indicates the number of samples and $p_g$ indicates PDF (probability density function)

In the case of one-bounce indirect illumination from a point light represented by the path $(x_0, x_j, x_3)$ where $j = \{1; 2\}$, $\hat{d}$ is obtained as follows:

$$d_{0,j} = d_{j,0} = N\left(p_g(\omega_{3,j}) \frac{\|x_j - x_0\|^2}{\|x_j - x_3\|^2} + p_e(\omega_{0,j})\right); \quad \text{[Number 11]}$$

$$d_{3,j} = d_{j,3} = N\left(p_g(\omega_{3,j}) + p_e(\omega_{0,j}) \frac{\|x_j - x_3\|^2}{\|x_j - x_0\|^2}\right)$$

$$\hat{d}_j = \frac{1}{\frac{1}{d_{j,0}} + \frac{1}{d_{j,3}}} \quad \text{[Number 12]}$$

$$\hat{d}_3 = d_{3,j}.$$

The appropriate n can be determined from the weight of reflection.

$$n = n' \frac{M}{D(\theta)} \quad \text{[Number 10]}$$

where n' is the user-specified parameter.

Example 2

Figures 7A, 7B, 7C, 7D:
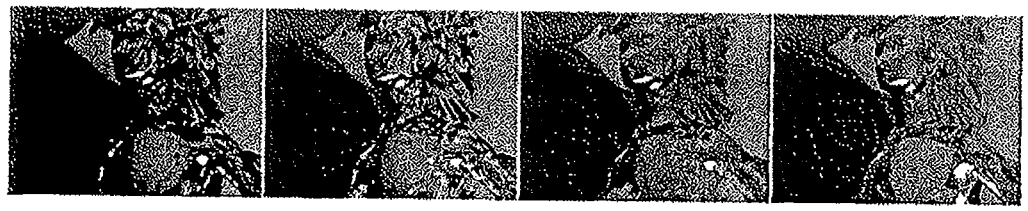
FIGS. 7A to 7D are diagrams showing a point light source and specular image computer graphics in a Cornell box.

The above-described algorithm is evaluated. The results of the evaluation are shown in FIGS. 7A to 7D. FIGS. 7A to 7D are diagrams showing a point light source and specular image computer graphics in a Cornell box ($\alpha=300$ and $N=84$). FIG. 7A shows an example in which suppression is not performed (comparative example), FIG. 7B shows an example of VSLs (maximum 10 sample points per VSL) (comparative example), FIG. 7C shows exemplary rendering of the present invention (parameter n' related to the maximum number of virtual neighbors n=8), and FIG. 7D shows the ground truth (using, as the frame buffer, 640×480 pixels, VPL shadow map: 256×256 pixels, and ray-bundles: 256×256 pixels and using as, the GPU, an AMD RADEON HD6850).

Since the same random numbers are used for all pixels in this implementation example, too, some artifacts occur due to the variance of Monte Carlo integration.

The present invention relates to computer graphics and thus can be used in computer and amusement fields.

Note that the present invention also includes matters included in the accompanying paper and the documents cited in the paper, and an invention obvious to those skilled in the art therefrom.

What is claimed is:

1. A shading method, comprising:
   sampling, by a computer, a path of light reflected at a given object from a virtual light source and reaching a given eye point;
   obtaining, by the computer, a distribution function for the surface of the object using the path obtained in the sampling, the distribution function including a roughness parameter of a surface of the object; and
   obtaining, by the computer, estimated specular roughness of the surface of the object by performing arithmetic processing such that a maximum value of the estimated specular roughness of the surface of the object is less than or equal to a predetermined value.

2. The shading method according to claim 1, wherein
   the distribution function is a distribution function for specular reflection at an intersection point of the path and the object, and
   the estimated specular roughness of the surface of the object is obtained by determining density of the path and the performing arithmetic processing uses the determined density of the path such that a maximum value of the distribution function for specular reflection is less than or equal to a predetermined value.

3. The shading method according to claim 1, wherein
   the obtaining of the estimated specular roughness includes:
      determining density of the path using the path obtained in the sampling;
      obtaining a distribution function for specular reflection at an intersection point of the path and the object; and
      determining the estimated specular roughness of the surface of the object by performing arithmetic processing using the density of the path such that a maximum value of the distribution function is less than or equal to a predetermined value.

4. A computer graphics system, comprising:
   a sampler for sampling a path of light reflected at a given object from a virtual light source and reaching a given eye point;
   a distribution function obtainer that obtains a distribution function for the surface of the object using the path obtained by the sampler, the distribution function including a roughness parameter of a surface of the object; and
   an estimated specular roughness obtainer that obtains estimated specular roughness of the surface of the object by performing arithmetic processing such that a maximum value of the estimated specular roughness of the surface of the object is less than or equal to a predetermined value.

5. The computer graphics system according to claim 4, wherein
   the estimated specular roughness obtainer includes:
      an estimated density calculator that determines density of the path using the path obtained by the sampler,
   the distribution function is a distribution function for specular reflection at an intersection point of the path and the object, and
   the estimated specular roughness of the surface of the object is determined by performing arithmetic processing using the density of the path such that a maximum value of the distribution function for specular reflection is less than or equal to a predetermined value.

* * * * *